(12) United States Patent
Zweifel

(10) Patent No.: US 6,289,289 B1
(45) Date of Patent: Sep. 11, 2001

(54) AIRCRAFT STRUCTURAL FATIGUE MONITOR

(75) Inventor: Terry L. Zweifel, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/209,169

(22) Filed: Dec. 10, 1998

(51) Int. Cl.⁷ .............................. G06F 19/00; G08B 23/00
(52) U.S. Cl. .......................... 702/34; 702/144; 340/966; 701/14
(58) Field of Search .............................. 702/34, 138, 144, 702/176, 178, 187–189; 340/959, 966, 967, 969; 701/4, 14–16, 35; 73/178 R, 178 T; 244/212, 215, 75 R

(56) References Cited

U.S. PATENT DOCUMENTS

| | | | |
|---|---|---|---|
| 3,272,973 | * 9/1966 | MacCready, Jr. | 702/189 |
| 3,387,120 | 6/1968 | Funk et al. | 235/150.2 |
| 3,733,424 | 5/1973 | Pitts et al. | 73/88.5 R |
| 3,979,579 | 9/1976 | Kleinpeter | 235/150.2 |
| 4,031,366 | 6/1977 | Hartung | 235/151.3 |
| 4,079,905 | 3/1978 | Greene | 244/191 |
| 4,336,595 | 6/1982 | Adams et al. | 364/508 |
| 4,563,684 | * 1/1986 | Maris | 340/966 |
| 5,383,133 | 1/1995 | Staple | 364/508 |
| 5,511,430 | 4/1996 | Delest et al. | 73/802 |
| 5,552,987 | * 9/1996 | Barger et al. | 701/14 |
| 5,595,357 | * 1/1997 | Catlin et al. | 340/966 |
| 5,639,964 | * 6/1997 | Djorup | 73/170.12 |
| 5,657,009 | 8/1997 | Gordon | 340/968 |
| 5,796,612 | * 8/1998 | Palmer | 702/144 |

FOREIGN PATENT DOCUMENTS

| | | |
|---|---|---|
| 0 407 179 A1 | 1/1991 | (EP) . |
| 1 018 641 A1 | 7/2000 | (EP) . |
| 2 021 261 A | 5/1979 | (GB) . |

* cited by examiner

Primary Examiner—Patrick Assouad
Assistant Examiner—Bryan Bui

(57) ABSTRACT

The present invention is a system for monitoring, storing, and reporting the accumulation of fatigue occurrences experienced by an aircraft. The system according to the present invention uses existing aircraft instrumentation to monitor fatigue occurrences. Data is collected on the magnitude and cycles of any turbulence encounters; magnitude and number of gloading accrued by aircraft maneuvering; the number of pressurization cycles that the aircraft has experienced; and the number of takeoffs/landing cycles that have occurred. These data are stored in electronic memory for later review by the flight crew or maintenance personnel. Additionally, the number of accumulated wing flap cycles and landing extensions/retractions may also be monitored to facilitate the maintenance operations of these two critical flight controls.

40 Claims, 5 Drawing Sheets

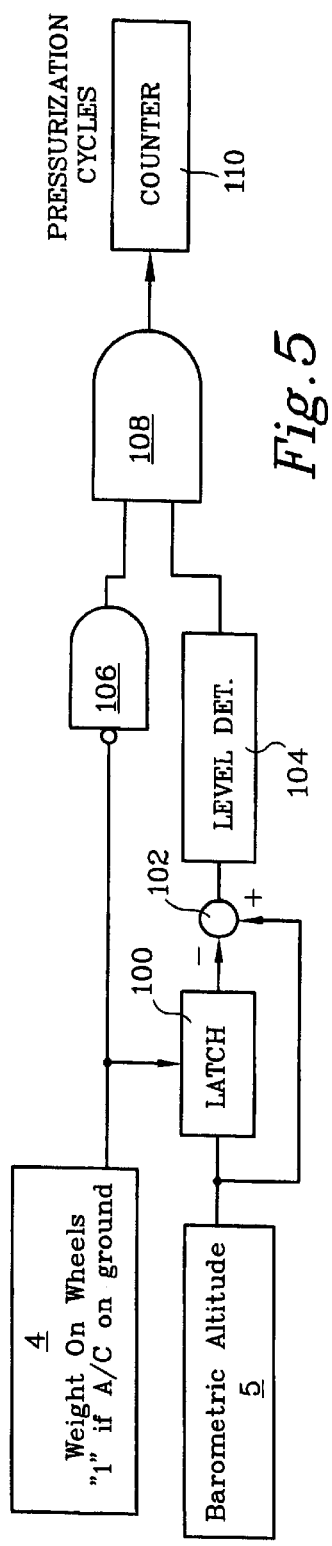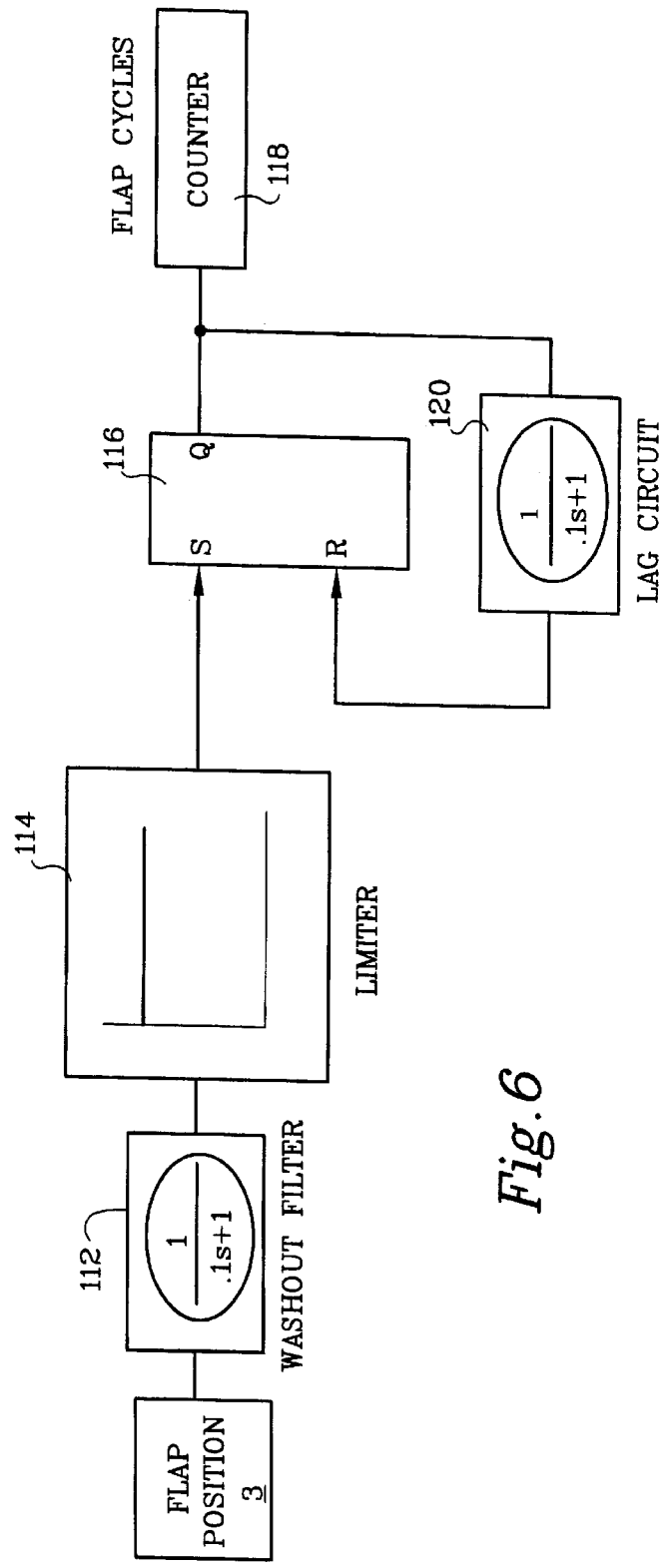

AIRCRAFT STRUCTURAL FATIGUE MONITOR

FIELD OF THE INVENTION

The invention relates in general to a system for monitoring accumulated structural fatigue experienced by an aircraft. More specifically, the present invention relates to a system that monitors the fatigue that accumulates on aircraft structures caused by vertical vibrations, such as turbulence and maneuvering, and pressurization—depressurization cycles.

BACKGROUND AND RELATED ART

At this time, the number of aircraft that exceed their originally designed lifetime service objectives is approximately 39% of the modem air transport fleet. Maintenance of these "aged" aircraft is an important issue; especially the evaluation of accumulated structural fatigue that may cause fatigue failure of the aircraft components during flight. It is estimated that about 3% of all aircraft accidents are a result of accumulated structural fatigue .

Cyclical loading caused by pressurization/ depressurization as the aircraft climbs and descends is a material contributor to fuselage fatigue and failure. These pressurization cycles account for from 90% to 100% of the fuselage fatigue life. Recent accidents have occurred that have been directly related to fuselage fatigue failure. In these instances, the aircraft's accumulated flight cycles exceeded the original design service objective, resulting in widespread materials fatigue, or skin cracking, around rivet holes. Ultimately structural failure, such as the separation of parts of the fuselage skin from the aircraft, occurred. As a direct result of these accidents, the aviation industry is increasingly concerned about aircraft component failures due to accumulated structural fatigue.

Aircraft also experience wing fatigue failures that are due to the loads placed on the aircraft by turbulence and maneuvers, in addition to the normal wing loads that occur during takeoffs and landings. The individual contributions of each phenomenon depend on the particular route of the individual aircraft, i.e., number of landings per day, turbulence encounters, flight path, and the like. An accepted estimate of the relative contribution to wing fatigue failure of the various components is: Turbulence 35% to 60%; Takeoffs and Landings: 35% to 50%; and, Maneuvers: 10% to 15%.

Presently, airlines routinely inspect aircraft for fatigue damage, typically during a "C" checks, which occur every 2,400 flight-hours. During the "C" check maintenance technicians use non-destructive equipment such as high-frequency eddy current ultrasound and x-rays to detect structural fatigue. However, "C" checks are expensive and cannot reasonably be done on a frequent basis. Thus, there is a need for a method that helps determine when an aircraft should be scheduled for additional fatigue testing, even before the scheduled "C" check.

By knowing the history of a given aircraft in terms of the parameters that affect fatigue life, airlines could adjust their fatigue maintenance schedules to accurately reflect the number of structural load cycles that the aircraft has encountered and thereby permitting safer aircraft operations while possibly reducing unnecessary maintenance actions.

SUMMARY OF THE INVENTION

A primary object of the present invention is to provide a system for monitoring, storing, and reporting the accumulation of fatigue occurrences experienced by an aircraft.

It is another object of the present invention to provide a system that monitors, stores, and reports the accumulation of fatigue occurrences experienced by an aircraft without the use of additional measuring devices.

It is a further object of the present invention to provide fatigue monitoring system in which data is collected on the magnitude and cycles of any turbulence encounters; magnitude and number of g-loading accrued by aircraft maneuvering; the number of pressurization cycles that the aircraft has experienced; and the number of takeoffs/landing cycles that have occurred. These data are stored in electronic memory for later review by the flight crew or maintenance personnel.

It is yet another object of the present invention to provide a fatigue monitoring system that accumulates the number of wing flap cycles and landing extensions/retractions, which may also be used to facilitate the maintenance operations of these two critical flight controls.

The novel features which are characteristic of the invention, both as to structure and method of operating thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 5 is an illustration of the pressurization and flap cycle monitoring according to the present invention.

FIG. 6 is an illustration of the monitoring of wing flap cycles according to the present invention.

DETAILED DESCRIPTION PREFERRED EMBODIMENTS

Figure 1:
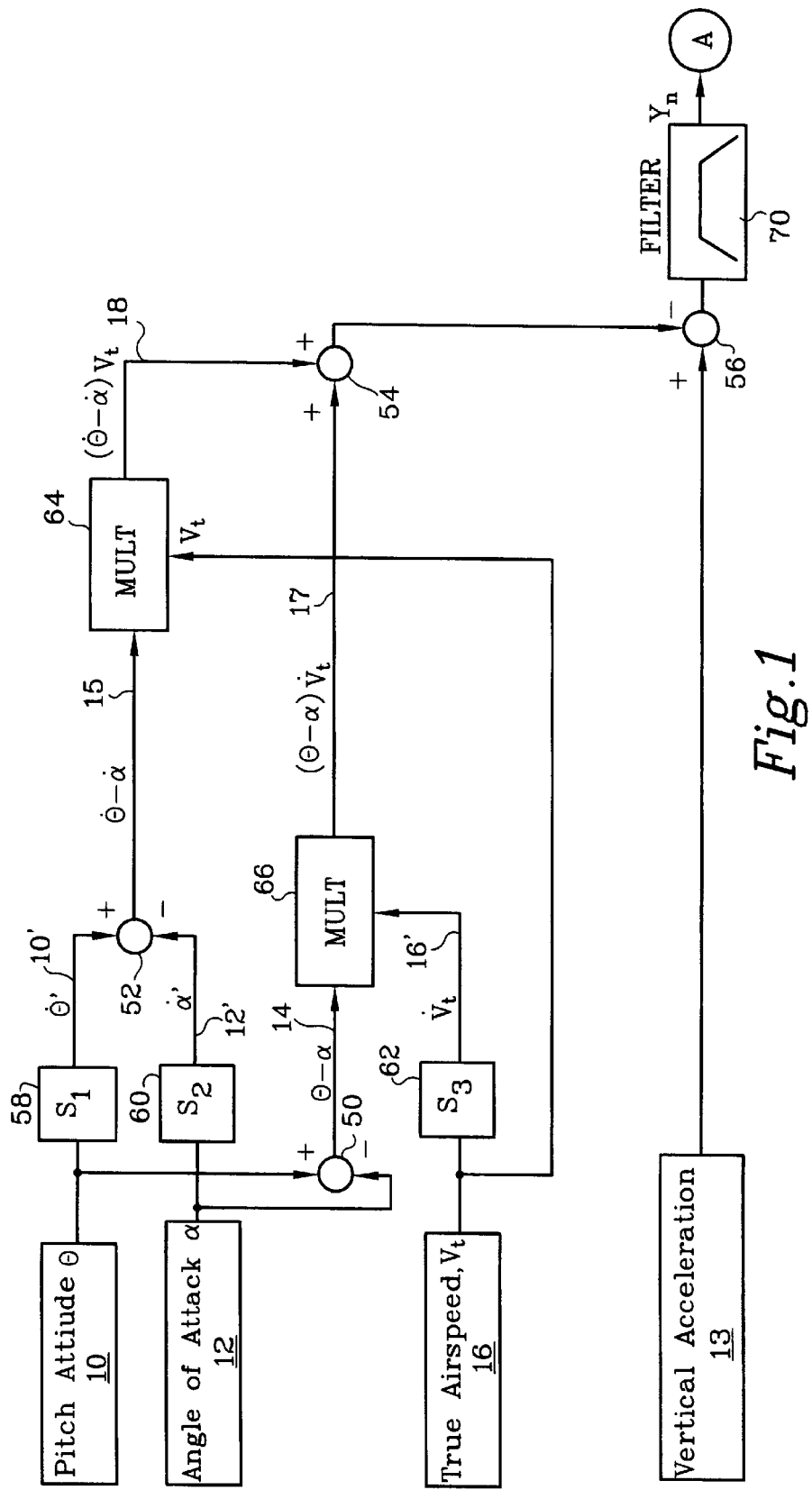
FIG. 1 is a block diagram illustrating the implementation of equation 8,determination of the vertical component of turbulence experienced by an aircraft.

The present invention is a system for monitoring, storing, and reporting the accumulation of fatigue occurrences experienced by an aircraft. The system according to the present invention uses existing aircraft instrumentation to monitor fatigue occurrences. Data is collected on the magnitude and cycles of any turbulence encounters; magnitude and number of g-loading accrued by aircraft maneuvering; the number of pressurization cycles that the aircraft has experienced; and the number of takeoffs/landing cycles that have occurred. These data are stored in electronic memory for later review by the flight crew or maintenance personnel. Additionally, the number of accumulated wing flap cycles and landing extensions/retractions may also be monitored to facilitate the maintenance operations of these two critical flight controls.

For clarity, each of the individual components of the present invention will be described separately, beginning with the turbulence monitoring.

Monitoring turbulence can be accomplished by comparing the aircraft's ground-based (inertial) vertical acceleration from its acceleration in the air mass. Using the well-known equation:

$$h'_{wind} = h'_{gnd} - h'_{air}, \quad (1)$$

where $h'_{wind}$ is the vertical wind speed, $h'_{gnd}$ is the aircraft's climb rate relative to the ground, and $h'_{air}$ is the aircraft's climb rate relative to the air mass. The prime symbol indicates a derivative of the term with respect to time.

Taking another time derivative of the above equation yields the equation for acceleration:

$$h''_{wind} = h''_{gnd} - h''_{air}, \quad (2)$$

where $h''_{gnd}$ is determined by an accelerometer mounted in the aircraft that measures the aircraft's vertical acceleration, $a_v$. The term $h''_{air}$ may be calculated using:

$$\gamma = h'_{air}/V_t, \quad (3)$$

where $\gamma$ is the aircraft's flight path angle relative to the air measured in radians and $V_t$ is the aircraft's true airspeed. This equation is a small angle approximation that is valid for typical flight path angles of commercial aircraft. Furthermore, it is well-known that:

$$\gamma = (\Theta - \alpha), \quad (4)$$

where $\Theta$ is the aircraft's pitch angle and $\alpha$ is the aircraft's angle of attack, both measured in radians. Equating the two equations yields:

$$(\Theta - \alpha) = h'_{air}/V_t. \quad (5)$$

Solving for $h'_{air}$ gives:

$$h'_{air} = (\Theta - \alpha) V_t. \quad (6)$$

Now, taking the derivative with respect to time according to the product rule gives:

$$h''_{air} = (\Theta' - \alpha') V_t + (\Theta - \alpha) V'_t \quad (7)$$

Hence, one can find the value of the vertical acceleration of the aircraft relative to the air mass from the above equation. Substituting in equation (1) provides:

$$h''_{wind} = a_v - \{(\Theta' - \alpha') V_t + (\Theta - \alpha) V'_t\}. \quad (8)$$

This equation provides an indirect measurement of the vertical component of turbulence, or any change in wind with respect to time. The implementation of this equation in block diagram form is shown on FIG. 1, and described below.

Preferably, the pitch attitude parameter, $\Theta$ 10, and the angle of attack parameter, $\alpha$ 12, are passed through a difference operator 50 to produce the approximated relative flight path angle parameter, $(\Theta - \alpha)$ 14. Simultaneously, their values are coupled to first and second differentiators, $s_1$ 58 and $s_2$ 60, to yield time derivatives, $\Theta'$ 10' and $\alpha'$ 12', respectively. The time derives, $\Theta'$ 10' and $\alpha'$ 12', are then coupled to a second difference 52 operator to produce the approximated relative flight path angle time derivative parameter $(\Theta' - \alpha')$ 14'.

The true airspeed parameter, $V_t$, 16 is coupled to a first multiplier operator 64, with the $(\Theta' - \alpha')$ 14' parameter to yield the product $(\Theta' - \alpha') V_t$ 18. Simultaneously, the true airspeed parameter, $V_t$, 16 is passed through a third differentiator, $S_3$ 62, and the result, $V_t'$ 16', coupled to a second multiplier operator 66 together with the $(\Theta - \alpha)$ 14 parameter, to yield the product, $(\Theta - \alpha) V'_t$ 17. These two resultant products, 17 and 18, are then combined by a summation operator 54 to yield a sum of products $\{(\Theta' - \alpha') V_t \, 18 + (\Theta - \alpha) V'_t \, 17\}$. A third difference operator 56 then subtracts said term from the value for the vertical acceleration parameter, $a_v$ 13, resulting in a measurement for the vertical component to turbulence, $h''_{wind}$.

Figure 2:
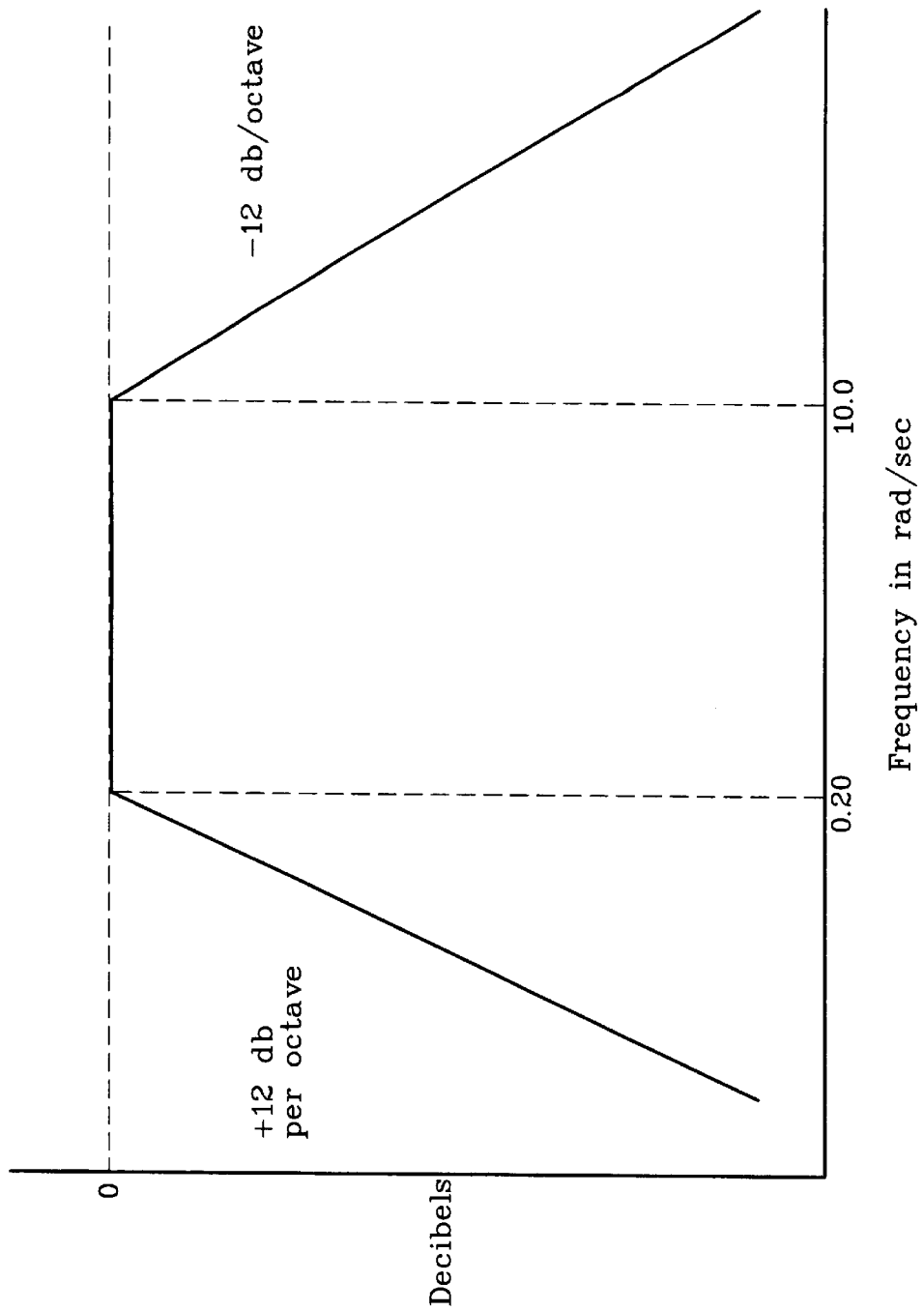
FIG. 2 is a more detailed illustration of the turbulence signal structural filtering detail.

NASA studies have shown that turbulence frequencies of interest for aircraft wing fatigue range between 0.20 radians per second and 10.0 radians per second. Therefore, a filter 70 shown on FIG. 1, and the frequency response in radians per second in FIG. 2, filters from the vertical component of turbulence, $h''_{wind}$, turbulence frequencies below 0.20 radians per second and those above 10.0 radians per second. Many alternate implementations of said filter 70 are considered to be common knowledge to ordinarily skilled practitioners. Accordingly, the filter 70 could be realized by equivalent hardware or software designs. In either case, the frequency response depicted in FIG. 2 is the primary design requirement.

Figure 3:
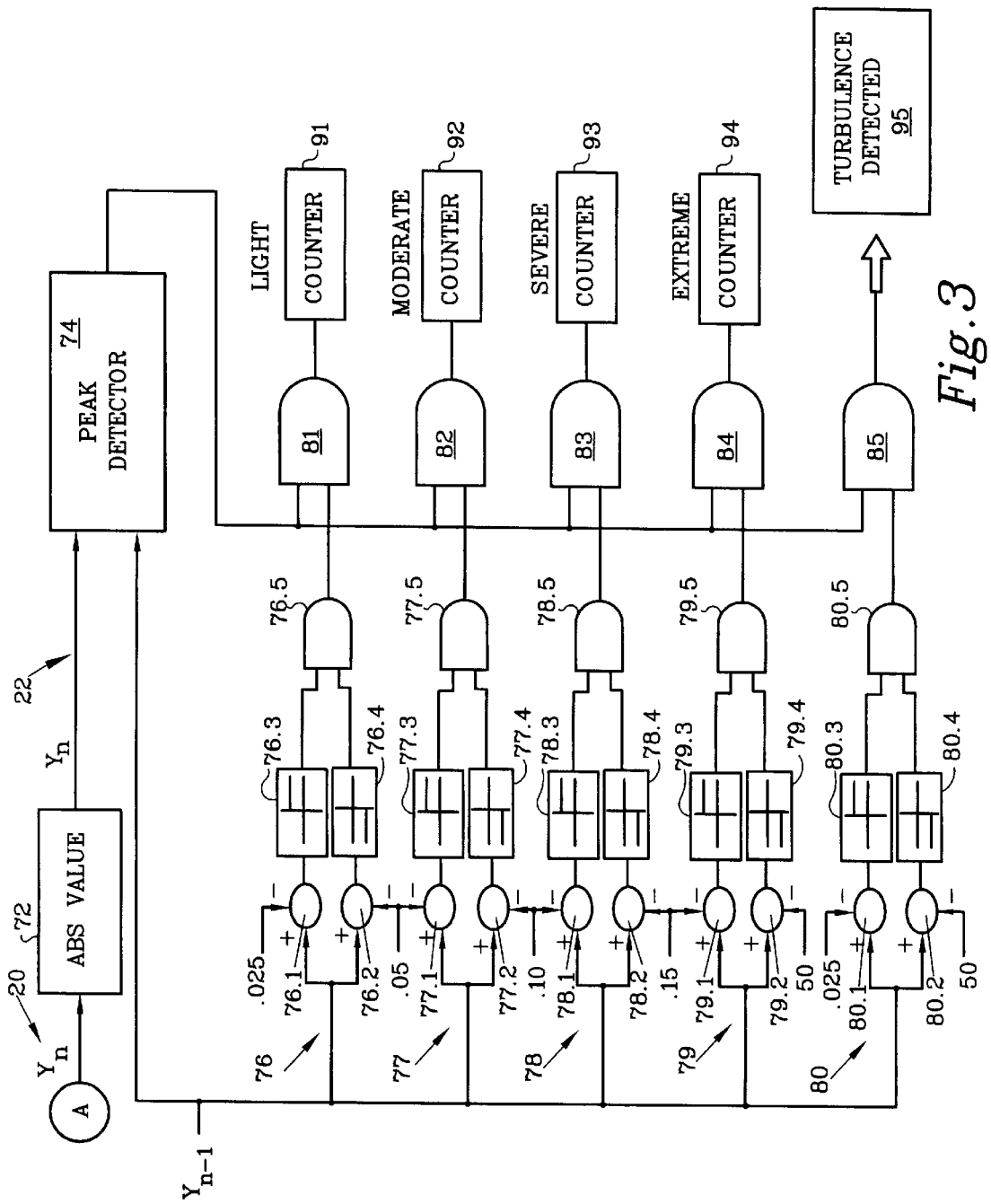
FIG. 3 is an illustration of the turbulence classification and storage according to the present invention.

The filtered vertical turbulence parameter, $h''_{wind}$ 20, is next coupled to an absolute value operator 72 to produce a rectified vertical turbulence parameter $Y_n$, 22, as shown in FIG. 3. Thus, the absolute value operator 72 converts negative values to positive values while leaving positive values unchanged.

The absolute value of the rectified vertical turbulence parameter $Y_n$ 22, is then coupled to a peak value detector 74, which has stored the last measured value of the rectified vertical turbulence parameter $Y_{n-1}$ 22. The peak value detector 74 determines if the magnitude of rectified vertical turbulence parameter $Y_n$, 22, is greater than any previously measured value. If a peak value has been detected, $Y_n > Y_{n-1}$, a logical "1" is output by the peak value detector 74. As with the filter 70 design, alternate peak value detector 74 designs are contemplated and considered to be within the knowledge possessed by an ordinarily skilled practitioner.

Simultaneously, the last measured value of turbulence parameter, $Y_{n-1}$, is quantified by an analog to digital converter represented in FIG. 3 by a series of computational peak magnitude comparator operators 76–80. Four of these operators 76–79 determine whether or not the peak magnitude value lies within a range of values that describe, in English, the relative magnitude of the turbulence.

For example, these ranges could be described as:

| | | |
|---|---|---|
| Light Turbulence | => | 0.025 g to 0.05 g; |
| Moderate Turbulence | => | 0.05 g to 0.10 g; |
| Severe Turbulence | => | 0.10 g to 0.15 g; and, |
| Extreme Turbulence | => | 0.15 g and above. |

As the illustration depicts, the previously detected turbulence value is simultaneously sent to four magnitude comparators 76–79. Thereafter each magnitude comparator 76–79 determines whether the turbulence value falls within a specified range. If this is true, then a logical "1" is output.

More specifically, for the embodiment depicted in FIG. 3, each magnitude comparator 76–79 has a pair of difference operators, a low range difference operator 76.1, 77.1, 78.1, and 79.1 and a high range difference operator 76.2, 77.2, 78.2, and 79.2. As the name implies, the difference operators subtract from the turbulence value, $Y_{n-1}$, a reference value corresponding to the turbulence table from above. Thereafter, each result from the high range difference operators 76.1, 77.1, 78.1, 79.1 are coupled to a high range polarity comparator 76.3, 77.3, 78.3, and and the values resulting from the high range difference operators 76.2, 77.2, 78.2, and 79.2 are coupled to a low range polarity comparator 76.4, 77.4, 78.4, 79.4. Each pair, for example 76.3 and 76.4, of high range and low range polarity comparators operate together such that when the value from the low range difference operator is greater than 0, a logical "1" is output to an AND gate 76.5, 77.5, 78.5 and 79.5, else a logical "0" is output; and, when the value from the high range difference operator is less than 0, a logical "1" is output to the AND gate 76.5, 77.5, 78.5 and 79.5, else a logical "0" is output. Thus, when the previous peak, $Y_{n-1}$, falls within the specified range, two logical "1"' s are sent to the AND gate 76.5, 77.5, 78.5 and 79.5 resulting in said gates outputting a logical "1". When the previous peak, $Y_{n-1}$ does not fall within the specified range, a logical "1" and a logical "0" is sent to the AND gate 76.5, 77.5, 78.5 and 79.5 resulting in said gates outputting a logical "0".

It is further contemplated that alternative implementations for quantifying the peak magnitude of turbulence encountered. For instance, a commercially available digital to analog converter integrated circuit could be used to digitize the peak magnitudes of turbulence. Thereafter, the digital data could be categorized according to the table above.

Once the magnitude of the turbulence parameter, $Y_n$, has been determined, it is supplied to a second logical AND gate, either 81, 82, 83, or 84 along with the output from the peak value detector 74. If a logical "1" is output by one of these AND gates either 81, 82, 83, or 84, it is then supplied to a counter thereby counting the number of occurrences of that specific turbulence magnitude. An additional magnitude comparator 80 with corresponding low range and high range difference operators, 80.1 and 80.2 respectively, low and high polarity comparators, 80.3 and 80.4 respectively, and first and second AND gates 80.5 and 85 are also provided in this embodiment. This additional magnitude comparator 80 and the corresponding circuitry create a logic output, Turbulence Detected 95, to announce the detection of turbulence.

In this manner, a history of turbulence encounters of an individual aircraft can be stored for the life of the aircraft in an efficient manner. This history can be accessed and used at any time with a suitable display unit, such as a multipurpose display unit of a flight management system, by the flight crew or maintenance personnel to determine if the aircraft needs to be inspected for possible structural fatigue.

Figure 4:
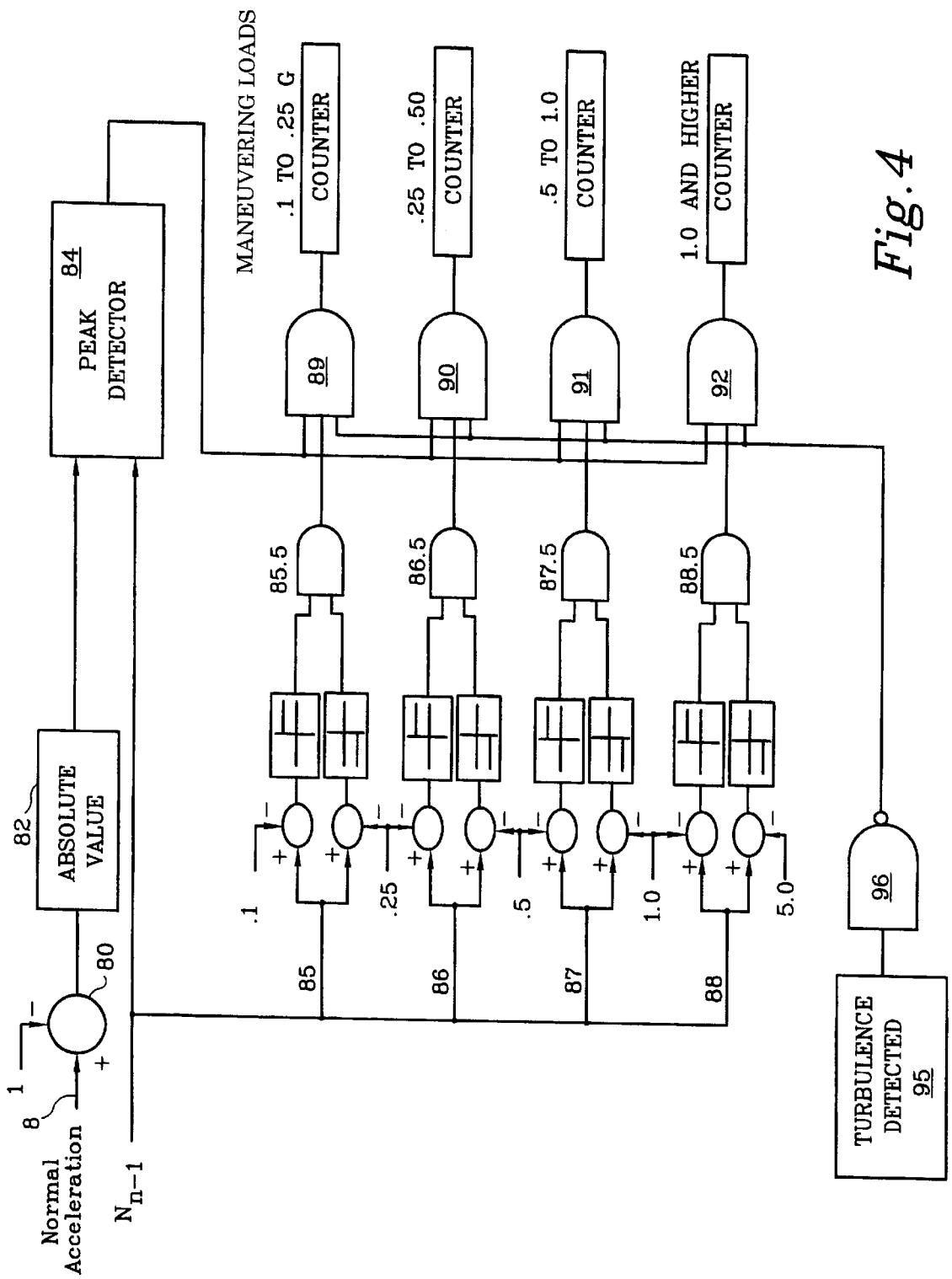
FIG. 4 is an illustration of the maneuvering classification and storage according to the present invention.

Another contributor to aircraft wing fatigue life is the maneuvering load sustained by the aircraft during flight control by the flight crew. In this case, it is useful to determine the ranges of the loads combined with the number of times each load occurred, as is illustrated in FIG. 4.

Here, the aircraft's normal accelerometer parameter 8 is supplied to a difference operator 80, which subtracts 1, the preset value due to the earth's gravity of the accelerometer in level, unaccelerated flight. The output of the difference operator 80 is rectified by an absolute value operator 82, $N_n$, and supplied to a peak value detector 84 whose function is identical to that described above. When a peak value is detected, the last measured value of the accelerometer $N_{n-1}$, is compared with the series of magnitude comparators 85, 86, 87, and 88 to a series of ranges whose typical values are shown on FIG. 4. Hence, if a peak value has been detected, a logical "1" is supplied to one of the four AND gates 89, 90, 91, 92 shown. When the range of the relative magnitude of the turbulence is determined, a logical "1" for the range is simultaneously supplied to the same AND gate.

Furthermore, to preclude the counting of turbulence encounters from corrupting the results, each maneuvering load counting AND gate 96 will output a logical "1" only if no turbulence has been detected. In this manner, only those aircraft loads as a result of maneuvering will be counted.

A further feature of the current invention is the counting of the number of pressurization's the aircraft has undergone. The number of pressurization cycles experienced by the aircraft is directly proportional to the fatigue life of the fuselage of the aircraft.

Referring to FIG. 5, an aircraft's barometric altitude parameter 5 is coupled to a latching network 100 whose features are well known to those skilled in the art. The latch stores the value of the barometric altitude parameter 5 whenever a parameter representing the aircraft's Weight On Wheels, ("WOW") 4, is a logical "1"; that is, whenever the aircraft is on the ground. Whenever the aircraft's WOW 4 signal becomes a logical "0", indicating that the aircraft has taken off, the stored value of barometric altitude parameter 5 is compared to the actual altitude via a summing junction 102 as shown. Whenever the difference between the actual altitude and the latched or stored value exceeds a predetermined amount, as for example, 100 feet, a level detector 104 will output a logical "1" to an AND gate 108. The second input to the AND gate 108 is the WOW signal negated by an inverter 106. Consequently, if the aircraft is 100 feet or more above the stored barometric altitude and the aircraft is off the ground, i.e., the WOW signal is "0", the output of the AND gate 108 is supplied to a counter 110. In this way, the number of takeoffs, and thereby the number of pressurization cycles, of the aircraft are stored in the counter 110.

Please note that the number of pressurization cycles is also a simultaneous measurement of the number of landing gear cycles that have occurred. This additional data may be used, via suitable display as discussed previously, by maintenance or flight crew personnel to determine if preventative maintenance or structural fatigue testing of the landing gear is warranted.

Finally, another feature of the current invention is the monitoring of wing flap cycles. An implementation is shown in FIG. 6. A parameter representing the flap position servos 3 of the aircraft is coupled to a conventional lead, or washout, filter 112. The washout filter 112 is such that it allows the system to be responsive only to changes from a previously averaged condition. Therefore, the filter 112 will qualify only deliberate flap position changes of a substantial nature.

The output of the filter 112 is thus proportional to the flap rate; i.e., the time rate of change of flap position. This signal is coupled to a conventional limiter 114 that simply formats the output into a logical "1". The output is then coupled to a conventional Flip-Flop 116. Hence, a logical "1" output from the limiter 114 will trigger the SET input of the Flip-Flop 116 which triggers a logical "1" at the output Q and thence to the flap cycle counter 118. The output of the Flip-Flop 116 is also supplied to a conventional lag circuit 120 whose output is delayed by a value of time proportional to the time constant of the lag circuit 120, as for example 0.1 seconds. The output of the lag circuit is then supplied to the RESET input of the Flip-Flop 116 that sets the output, Q, to zero. In this manner, the output of the Flip Flop 116 at Q is a pulse that is used by the counter 118.

The counted number of flap cycles may then be used, via suitable display as discussed earlier, to allow maintenance or flight crew personnel to determine when preventative maintenance and/or structural fatigue testing of the wing flaps should be preformed.

It should be understood that the foregoing specific components illustrated and described in the specification are not to be interpreted as limiting the scope of the invention. The breadth and depth of the overall inventive concept are deemed to be limited only by the following appended claims.

What is claimed is:

1. A system for monitoring, storing, and reporting the accumulation of fatigue occurrences experienced by an aircraft comprising:
   a. collecting magnitude and number of cycles of turbulence encounters,
   b. collecting magnitude and number of g-loading accrued by aircraft maneuvering,
   c. counting pressurization cycles that the aircraft has experienced,
   d. counting the number of flap cycles that have occurred, and
   e. storing the data obtained in steps a–d in an electronic memory, wherein said step of collecting magnitude and number of cycles of turbulence encounters further comprises;
   f. comparing a pitch attitude parameter θ (10) and an angle of attack parameter α (12) to obtain the algebraic difference of said pitch attitude parameter θ (10) and said angle of attack parameter α' (12),
   g. differentiating said pitch attitude parameter θ (10) to obtain a pitch attitude time derivative parameter θ' (10'),
   h. differentiating said angle of attack parameter α (12) to obtain a time derivative angle of attack parameter α' (12'),
   i. differentiating a true airspeed parameter $V_t$ (16) to obtain a time derivative true airspeed parameter $V_t'$ (16'),
   j. multiplying said algebraic difference of said pitch attitude time derivative parameter θ' (10'), and said time derivative angle of attack parameter α' (12'), by said true airspeed parameter $V_t$ (16), to obtain the product $(θ'-α') \cdot V_t$ (18), k. multiplying said algebraic difference of said pitch attitude parameter θ (10) and said angle of attack parameter α (12), by said time derivative time airspeed parameter $V_t'$ (16'), to obtain the product $(θ-α) \cdot V_t'$ (17), and l. summing said product, $(θ'-α') \cdot V_t$ (18), of said first multiplier operator (64) with said product, $(θ-α) \cdot V_t'$ (17), of said second multiplier operator (66) to obtain a sum of products, $(θ'-α') \cdot V_t$ (18)+$(θ-α) \cdot V_t'$ (17), with a vertical acceleration parameter, $a_v$ (13).

2. The system of claim 1 wherein said step of collecting magnitude and number of cycles of turbulence encounters further comprises filtering said magnitude and number of cycles of turbulence encounters to attenuate turbulence frequencies below 0.20 radians per second and above 10.0 radians per second with a filter, to obtain a filtered vertical turbulence parameter, h" wind.

3. The system of claim 1 wherein said step of collecting magnitude and number of cycles of turbulence encounters further comprises;
   a. rectifyig said filtered vertical turbulence parameter, h" wind, with an absolute value operator to obtain a rectified vertical turbulence parameter $Y_n$,
   b. detecting the peak magnitude of said rectified vertical turbulence parameter $Y_n$,
   c. quantifying said peak magnitude of said rectified vertical turbulence parameter $Y_n$, and
   d. counting the number of said peak magnitude detections of said rectified vertical turbulence parameter $Y_n$.

4. The system of claim 3 wherein said step of quantifying said peak magnitude of said rectified vertical turbulence parameter $Y_n$ further comprises the step of classifying said peak magnitude of said rectified vertical turbulence parameter $Y_n$ into at least two classes.

5. The system of claim 4 wherein said step of categorizing said peak magnitude of said rectified vertical turbulence parameter $Y_n$ into at least two classes further comprises the step of classifying said peak magnitude into classes described by;

| | | |
|---|---|---|
| Light Turbulence | => | 0.025 g to 0.05 g; |
| Moderate Turbulence | => | 0.05 g to 0.10 g; |
| Severe Turbulence | => | 0.10 g to 0.15 g; and, |
| Extreme Turbulence | => | 0.15 g and above. |

6. The system of claim 1 wherein said step of collecting magnitude and number of g-loading accrued by aircraft maneuvering further comprises the steps of,
   a. compensating an aircraft accelerometer parameter for Earth's gravity to obtain a compensated aircraft accelerometer parameter,
   b. rectifying said compensated aircraft accelerometer parameter,
   c. detecting said peak magnitude of said aircraft accelerometer parameter,
   d. quantifying said peak magnitude of said aircraft accelerometer parameter,
   e. compensating said peak magnitude of said aircraft accelerometer parameter, for said magnitude and number of cycles of turbulence encounters, and
   f. counting said peak magnitudes of said aircraft accelerometer parameter that have been previously compensated for said magnitude and number of cycles of turbulence encounters.

7. The system of claim 6 wherein said step of quantifying said peak magnitude of said aircraft accelerometer parameter further comprises the step of classifying said peak magnitude of said aircraft accelerometer parameter into at least two classes.

8. The system of claim 7 wherein said step of aircraft accelerometer parameter into at least two classes further comprises the step of classifying said aircraft accelerometer parameter into classes described by the ranges; 0.025 g to 0.05 g; 0.05 g to 0.10 g; 0.10 g to 0.15 g; and 0.15 g and above.

9. The system of claim 1 wherein said step of counting pressurization cycles that the aircraft has experienced further comprises detecting a change in an aircraft's barometric altitude parameter, and counting the number of times said aircraft's barometric altitude parameter changes.

10. The system of claim 9 wherein said step of counting the number of times said aircraft's barometric altitude parameter changes further comprises the step of qualifying the change of said aircraft's barometric altitude parameter to correspond to greater than one hundred feet before said change in said barometric altitude parameter is counted.

11. The system of claim 1 wherein said step of counting the number of flap cycles that have occurred further comprises the steps of filtering the parameter representing the flap position servos to detect flap position changes and counting the number of said flap position changes.

12. The system of claim 1 wherein said step of counting the number of flap cycles that have occurred further comprises the step of qualifying the said flap position change to correspond to a only deliberate flap position changes of a substantial nature.

13. A method for monitoring, storing, and reporting the accumulation of fatigue occurrences experienced by an aircraft comprising:
   a. collecting magnitude and number of cycles of turbulence encounters,
   b. collecting magnitude and number of g-loading accrued by aircraft maneuvering,
   c. counting pressurzation cycles that the aircraft has experienced,
   d. counting the number of flap cycles that have occurred, and
   e. storing the data obtained in steps a–d in an electronic memory;
wherein said step of collecting magnitude of cycles of turbulence encounters includes determining a sum comprising:
   a first quantity representing a product of the aircraft's rate of change of true airspeed and an algebraic difference between the aircraft's pitch attitude and angle of attack and
   a second quantity representing a product of the aircraft's true airspeed and an algebraic difference between the aircraft's rates of change of pitch attitude and angle of attack.

14. The method of claim 13 wherein said step of collecting magnitude and number of cycles of turbulence encounters comprises determining the vertical component of turbulence.

15. The method of claim 14 further comprising filtering said magnitude and number of cycles of turbulence encounters to attenuate turbulence frequencies that are less than a predetermined minimum turbulence frequency to produce a filtered vertical turbulence parameter.

16. The method of claim 15 wherein said predetermined minimum turbulence frequency is 0.20 radians per second.

17. The method of claim 14 further comprising filtering said magnitude and number of cycles of turbulence encounters to attenuate turbulence frequencies greater that a predetermined maximum turbulence frequency from said vertical component of turbulence to produce a filtered vertical turbulence parameter.

18. The method of claim 17 wherein said predetermined maximum turbulence frequency is 10.0 radians per second.

19. The method of claim 14 further comprising coupling said vertical component of turbulence to an absolute value operator to produce a rectified vertical component of turbulence.

20. The method of claim 19 further comprising detecting a peak value of said rectified vertical component of turbulence.

21. The method of claim 20 further comprising determining whether the magnitude of said peak value falls within a predetermined range.

22. The method of claim 21 wherein said predetermined range comprises a plurality of relative magnitude ranges.

23. The method of claim 22 wherein said relative magnitude ranges are described by:
   Light Turbulence: 0.025 g to 0.045 g;
   Moderate Turbulence: 0.05 g to 0.10 g;
   Severe Turbulence: 0.10 g to 0.15 g; and
   Extreme Turbulence: greater than 0.15 g.

24. The method of claim 21 further comprising classifying said peak value in accordance with whether the magnitude of said peak value falls within said predetermined range.

25. The method of claim 24 further comprising announcing the classification of said peak value in response to the magnitude of said peak value falling within said predetermined range.

26. The method of claim 24 further comprising storing the classification of said peak value in response to the magnitude of said peak value falling within said predetermined range.

27. The method of claim 21 further comprising announcing the detection of a peak value in response to the magnitude of said peak value falling within said predetermined range.

28. The method of claim 20 further comprising storing the detection of a peak value.

29. The method of claim 28 further comprising counting the number of said detections of said peak values.

30. The method of claim 13 wherein said step of counting pressurization cycles that the aircraft has experienced comprises detecting the occurrence of a change in the aircraft's barometric altitude parameter.

31. The method of claim 30 wherein said change in the aircraft's barometric altitude parameter corresponds to a change in altitude that is greater than 100 feet.

32. The method of claim 31 further comprising counting the number of said occurrences.

33. The method of claim 30 further comprising counting the number of said occurrences.

34. The method of claim 13 wherein said step of counting the number of flap cycles that have occurred comprises monitoring a parameter that represents the status of a flap position servo.

35. The method of claim 34 further comprising filtering said parameter to indicate flap position changes.

36. The method of claim 35 further comprising counting the number of said flap position changes.

37. A method for monitoring, storing, and reporting the accumulation of fatigue occurrences experienced by an aircraft comprising:
   a. collecting magnitude and number of cycles of turbulence encounters,
   b. collecting magnitude and number of g-loading accrued by aircraft maneuvering,
   c. counting pressurion cycles that the aircraft has experienced,
   d. counting the number of flap cycles that have occurred, and
   e. storing the data obtained in steps a–d in an electronic memory,
wherein said step of collecting magnitude and number of g-loading accrued by aircraft maneuvering comprises:
   f. compensating an aircraft accelerometer parameter for earth's gravity to obtain a compensated aircraft accelerometer parameter;
   g. rectifying said compensated aircraft accelerometer parameter;

h. detecting said peak magnitude of said aircraft accelerometer parameter;

i. quantifying said peak magnitude of said aircraft accelerometer parameter, j. compensating said peak magnitude of said aircraft accelerometer parameter for said magnitude and number of cycles of turbulence encounters, and k. counting said peak magnitudes of said aircraft accelerometer parameter that previously have been compensated for said magnitude and number of cycles of turbulence encounters.

38. The method of claim 37 wherein said step of quantifying said peak magnitude of said aircraft accelerometer parameter further comprises the step of classifying said peak magnitude of said aircraft accelerometer parameter into one of at least two classes.

39. The method of claim 38 wherein said at least two classes are described by the ranges: from 0.025 g to 0.05 g; from 0.05 g to 0.10 g; from 0.10 g to 0.15 g; and greater than 0.15 g.

40. A method for monitoring, storing, and reporting the accumulation of fatigue occurrences experienced by an aircraft comprising:

a. collecting magnitude and number of cycles of turbulence encounters, b. collecting magnitude and number of g-loading accrued by aircraft maneuvering, c. counting pressurization cycles that the aircraft has experienced, d. counting the number of flap cycles that have occurred, and e. storing the data obtained in steps a–d in an electronic memory, wherein said step of counting the number of flap cycles that have occurred flirter comprises:

f. monitoring a parameter that represents the status of a flap position servo, g. filtering said parameter to indicate flap position changes, h. qualifying said flap position change to correspond to only deliberate flap position changes of a substantial nature, and i. counting the number of said flap position changes.

* * * * *